(12) United States Patent  (10) Patent No.: US 8,302,194 B2
Conrad et al.  (45) Date of Patent: Oct. 30, 2012

(54) USING FILE PREVALENCE TO INFORM AGGRESSIVENESS OF BEHAVIORAL HEURISTICS

(75) Inventors: Robert Conrad, Culver City, CA (US);
Joseph Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 326 days.

(21) Appl. No.: 12/606,163

(22) Filed: Oct. 26, 2009

(65) Prior Publication Data
US 2011/0099634 A1 Apr. 28, 2011

(51) Int. Cl.
G06F 12/14 (2006.01)
G06F 7/04 (2006.01)
G06F 11/30 (2006.01)
G06F 15/173 (2006.01)
G06F 15/16 (2006.01)
H04L 29/06 (2006.01)
H04L 9/32 (2006.01)

(52) U.S. Cl. ............... 726/24; 726/25; 726/26; 713/151; 713/165; 713/168; 713/187; 713/188; 709/224; 709/225; 709/232

(58) Field of Classification Search ............... 726/24–26; 713/151, 165, 168, 187, 188; 709/224, 225, 709/232
See application file for complete search history.

(56) References Cited

U.S. PATENT DOCUMENTS

| 2007/0079379 | A1* | 4/2007 | Sprosts et al. ................. 726/24 |
| 2008/0263659 | A1 | 10/2008 | Alme |
| 2009/0172815 | A1 | 7/2009 | Gu et al. |
| 2009/0187992 | A1 | 7/2009 | Poston |

OTHER PUBLICATIONS

PCT/US10/54129 Search Report and Written Opinion concerning counterpart PCT application, 8 pages, Dec. 23, 2010, Symantec Corporation.

* cited by examiner

*Primary Examiner* — Aravind Moorthy
(74) *Attorney, Agent, or Firm* — Brill Law Office; Jeffrey Brill

(57) ABSTRACT

The prevalence rate of a file to be subject to behavior based heuristics analysis is determined, and the aggressiveness level to use in the analysis is adjusted, responsive to the prevalence rate. The aggressiveness is set to higher levels for lower prevalence files and to lower levels for higher prevalence files. Behavior based heuristics analysis is applied to the file, using the set aggressiveness level. In addition to setting the aggressiveness level, the heuristic analysis can also comprise dynamically weighing lower prevalence files as being more likely to be malicious and higher prevalence files as being less likely. Based on the applied behavior based heuristics analysis, it is determined whether or not the file comprises malware. If it is determined that the file comprises malware, appropriate steps can be taken, such as blocking, deleting, quarantining and/or disinfecting the file.

18 Claims, 3 Drawing Sheets

USING FILE PREVALENCE TO INFORM AGGRESSIVENESS OF BEHAVIORAL HEURISTICS

TECHNICAL FIELD

This disclosure pertains generally to computer security, and more specifically to using the prevalence of files to inform the aggressiveness of corresponding behavioral heuristic malware detection.

BACKGROUND

Systems exist to detect (and thus eliminate) malware (e.g., viruses, worms, Trojan horses, spyware, etc.). Such malware detection systems typically work by using either static bit signatures and/or heuristics to identify malware. Static bit signature based malware detection involves identifying a specific bit-level pattern (signature) in known malware. Files are then scanned to determine whether they contain this signature. When malware is identified using static file signatures, the certainty of the conviction is high. However, signature based detection can be circumvented by changing content. Signatures have become less useful, as malware authors have become more sophisticated at manipulating their malware to avoid signature based detection.

Heuristic malware detection involves determining the likelihood of a given file being malware by applying various decision-based rules or weighing methods. Heuristic analysis can produce a useful result in many circumstances, but there is no mathematical proof of its correctness. In static file heuristics, the contents of the file is heuristically analyzed. In behavior based heuristics, the behavior of the program is heuristically analyzed. Both methods involve training a heuristic analyzer with a sample set of malware and clean files, so that it can make generalizations about the types of content or behaviors associated with each. Identifications of suspected malware using heuristic analysis can never, by definition, be entirely certain, as heuristic analysis only determines a likelihood of a file being clean or malicious. The confidence in heuristic based file convictions further suffers from the fact the training set is difficult to define, and is always different than the real world set.

One chief drawback of behavioral based malware detection is false positives. Due to the inherent uncertainty in heuristic analysis, the potential exists to convict a non-malicious file that appears to be acting in a malicious manner. Falsely classifying clean files as malicious is problematic, because it often results in legitimate, potentially important content being blocked. To address this problem, the aggressiveness of the heuristics used is often turned down, so as to lower the false positive rate. Unfortunately, dialing down the aggressiveness of the heuristics concomitantly causes the detected true positive rate to fall as well. In other words, by using weaker heuristics, malicious files are more likely to be falsely classified as being clean and passed through to users.

Tracking the reputations of sources from which electronic data originates is another technique used to identify malicious files. For example, the reputations of email addresses and domains can be tracked to identify trustworthy versus potentially malicious email senders and file signatures. Reputation based file classification can be effective when the source of a given file is well known. Where a lot of electronic content originates from a source over time, the reputation of that source can be confidentially evaluated and used to screen or pass through content. Unfortunately, reputation based file classification has difficulty confidently evaluating sources in the low prevalence range.

It would be desirable to address these issues.

SUMMARY

A heuristics aggressiveness management system adjusts an aggressiveness level to use in behavior based heuristics malware detection, based on target file prevalence rates. The prevalence rate of a file to be subject to behavior based heuristics analysis is determined, for example based on input from a reputation tracking or malware detection system. The aggressiveness level to use in the behavior based heuristics analysis of the file is adjusted, responsive to the determined prevalence rate of the file. More specifically, the aggressiveness level is set to higher levels for lower prevalence files and to lower levels for higher prevalence files. In one embodiment, false positive tolerance levels are set for files at different prevalence rates, and Receiver Operating Characteristics based analysis is used to set corresponding aggressiveness levels. Behavior based heuristics analysis is applied to the file, using the set aggressiveness level. This can involve, for example, varying the treatment of file attributes and/or measuring different file attributes during the behavior based heuristics analysis of the file, responsive to the aggressiveness level being used. In addition to setting the aggressiveness level, in some embodiments, the heuristic analysis also comprises dynamically weighing lower prevalence files as being more likely to be malicious and higher prevalence files as being more likely to be legitimate. Based on the applied behavior based heuristics analysis, it is determined whether or not the file comprises malware. If it is determined that the file does not comprise malware, normal file processing is allowed to proceed as desired. On the other hand, if it is determined that the file does comprise malware, additional steps can be taken, such as blocking the file, deleting the file, quarantining the file and/or disinfecting the file.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
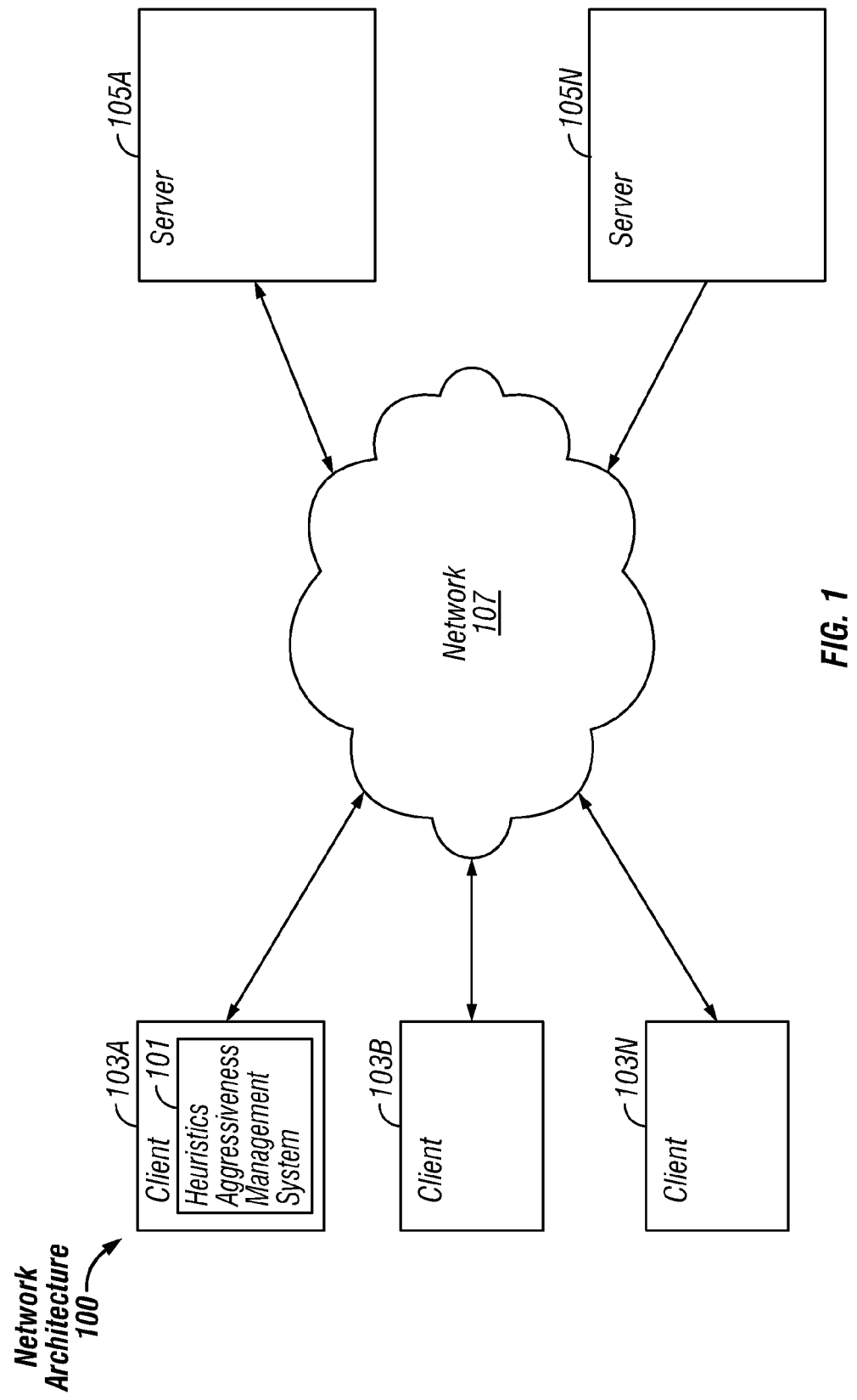
FIG. 1 is a block diagram of an exemplary network architecture in which a heuristics aggressiveness management system can be implemented, according to some embodiments.

FIG. 1 is a block diagram illustrating an exemplary network architecture 100 in which a heuristics aggressiveness management system 101 can be implemented. The illustrated network architecture 100 comprises multiple clients 103A, 103B and 103N, as well as multiple servers 105A and 105N. In FIG. 1, the heuristics aggressiveness management system 101 is illustrated as residing on client 103A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
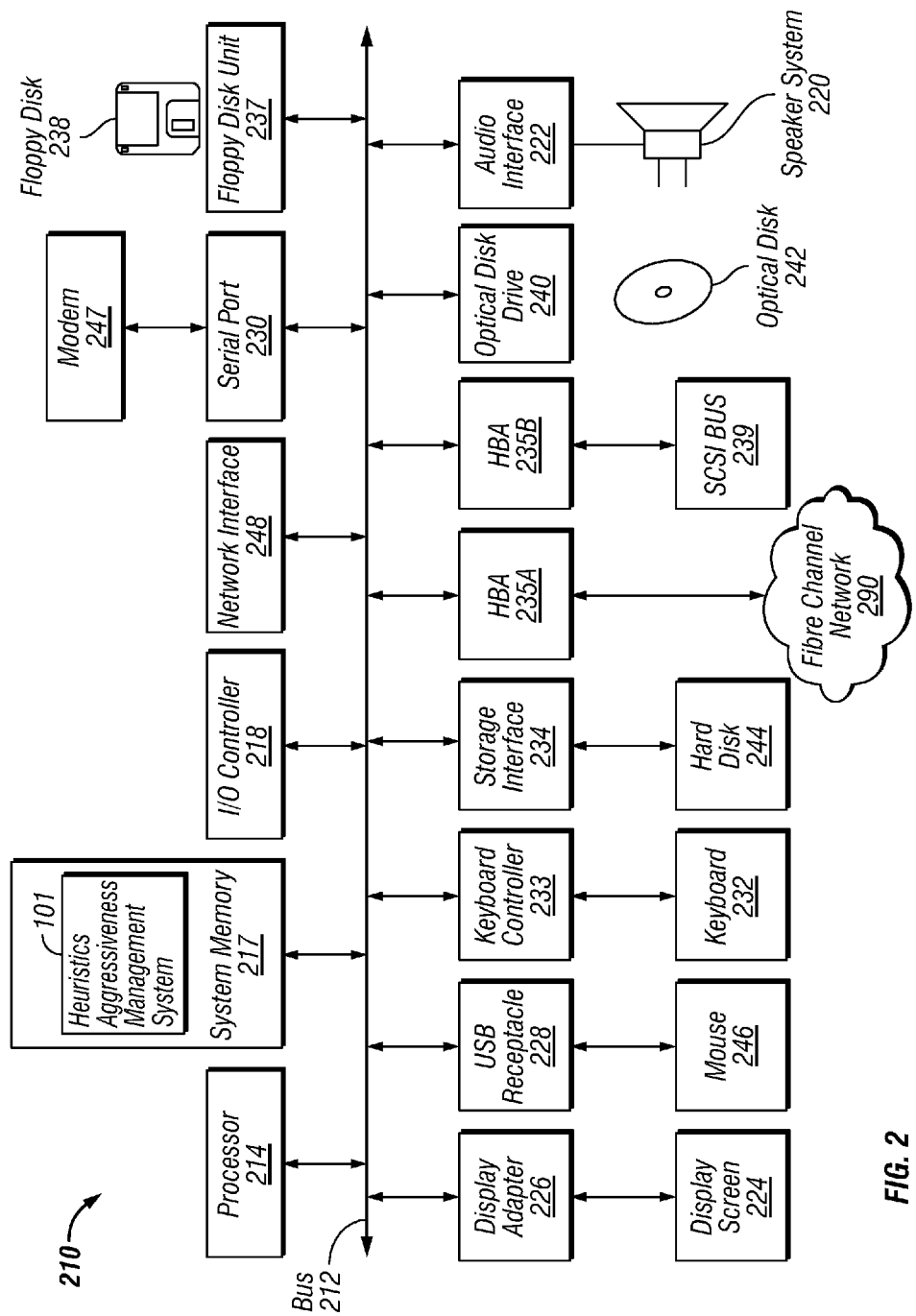
FIG. 2 is a block diagram of a computer system suitable for implementing a heuristics aggressiveness management system, according to some embodiments.

FIG. 2 is a block diagram of a computer system 210 suitable for implementing a heuristics aggressiveness management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/ or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the heuristics aggressiveness management system 101 is illustrated as residing in system memory 217. The workings of the heuristics aggressiveness management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
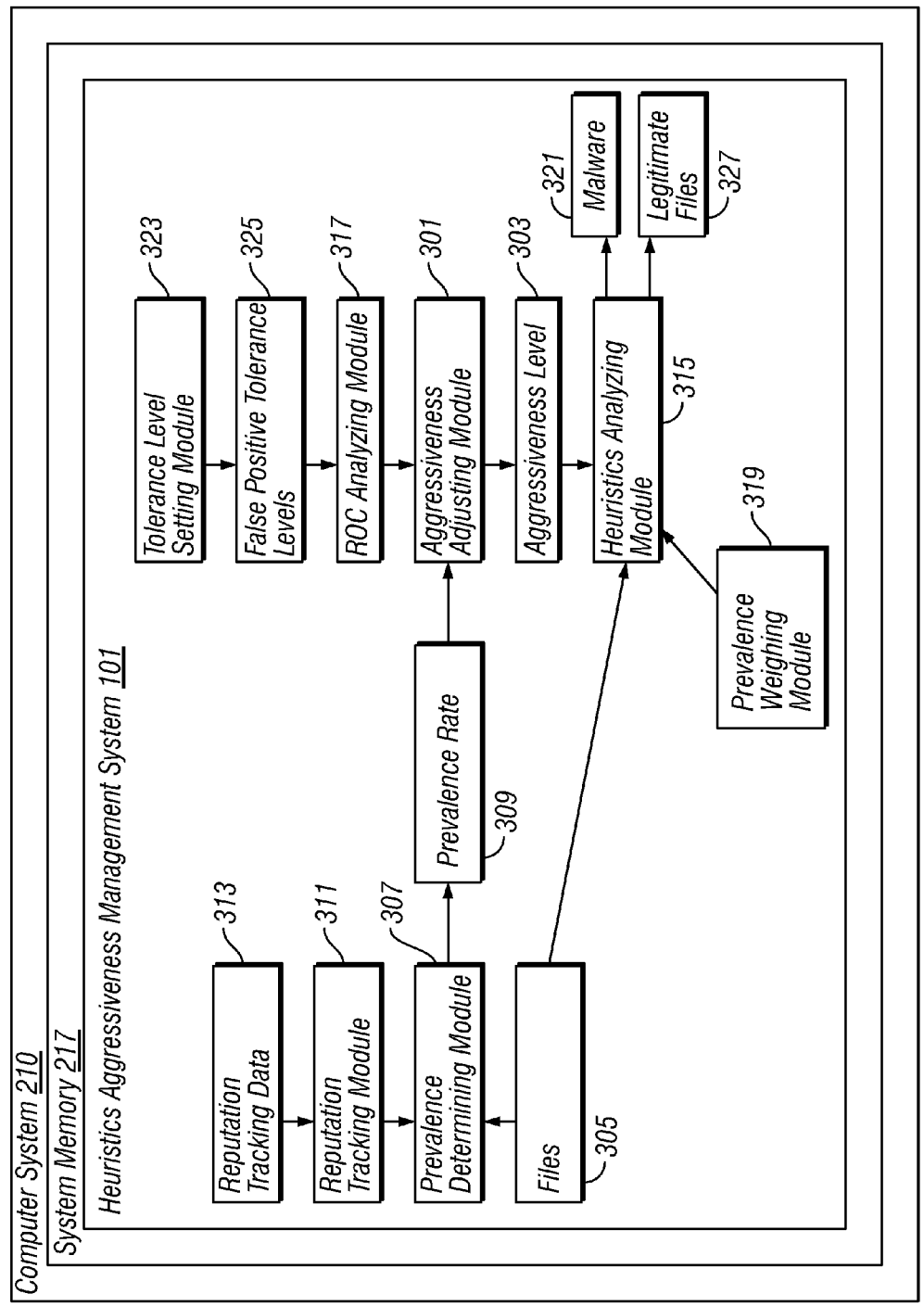
FIG. 3 is a block diagram of the operation of a heuristics aggressiveness management system, according to some embodiments.

FIG. 3 illustrates the operation of a heuristics aggressiveness management system 101, residing in the system memory 217 of a computer system 210 according to some embodiments. As described above, the functionalities of the heuristics aggressiveness management system 101 can reside on a client 103, a server 105, or be distributed between multiple computer systems 210, including within a cloud-based computing environment in which the functionality of the heuristics aggressiveness management system 101 is provided as a service over a network 107. It is to be understood that although the heuristics aggressiveness management system 101 is illustrated in FIG. 3 as a single entity, the illustrated heuristics aggressiveness management system 101 represents a collection of functionalities, which can be instantiated as a single or multiple modules as desired (an instantiation of specific, multiple modules of the heuristics aggressiveness management system 101 is illustrated in FIG. 3). It is to be understood that the modules of the heuristics aggressiveness management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the heuristics aggressiveness management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, an aggressiveness adjusting module 301 of the heuristics aggressiveness management system 101 adjusts a sliding behavioral heuristics aggressiveness level 303, as a function of the in-field prevalence rate 309 of the target file 305 being examined.

In general, malware 321 that is highly prevalent tends to be detected in due course. In other words, once a particular malicious file 305 is widely distributed, malware detection systems tend to identify it. Once widely distributed malware 321 has been identified, a corresponding signature can be created and used by malware detection systems to identify and block it. Lower prevalence malware 321 is less likely to have been identified and signaturized, and thus greater reliance is placed on other detection methodologies such as behavior based heuristics analysis. For these reasons, as described in detail below, the aggressiveness adjusting module 301 increases the aggressiveness level 303 with which to conduct behavior based heuristics analysis on lower prevalence files 305, and decreases the aggressiveness level 303 for higher prevalence files 305.

As is illustrated in FIG. 3, a prevalence determining module 307 determines the prevalence rate 309 of files 305 that are to be subject to behavior based heuristics analysis for detection of malware 321. In one embodiment, the prevalence determining module 307 gleans this information from a reputation tracking module 311, as illustrated. Typically, the reputation tracking module 311 is associated with a malware detection system that uses reputation tracking, and thus has access to a broad base of reputation tracking data 313 and hence information identifying the in-field prevalence rates 309 of various files 305. In other embodiments, the prevalence determining module 307 determines prevalence rates 309 based on input from a different source, such as a centralized malware detection system repository (not illustrated) with data compiled from a plurality of client agents (not illustrated) deployed in the field. It is to be understood that the prevalence determining module 307 specifically and the heuristics aggressiveness management system 101 and behavior based heuristics analysis generally, can but need not be part of a larger, malware detection system that also employs other techniques (e.g., signature based analysis, reputation tracking) to detect and manage malware.

The aggressiveness adjusting module 301 adjusts the aggressiveness level 303 with which to conduct behavior based heuristics analysis on individual files 305 based on their associated prevalence rates 309, as determined by the prevalence determining module 307. The highest level of aggressiveness 303 is used for singleton files 305 (i.e., files 305 which the prevalence determining module 307 has not seen before). As explained above, higher levels of aggressiveness 303 result in higher true positive rates, which are desirable for low-prevalence files 305 due to the difficulty in detecting their potential maliciousness other ways. Higher levels of aggressiveness 303 also tend to result in higher false positive rates. Therefore, as the prevalence rates 309 of files 305 increase, the aggressiveness adjusting module 301 correspondingly lowers the level of aggressiveness 303 to use.

It is to be understood that varying the level of aggressiveness 303 can affect how certain combinations of file attributes are treated during the behavior based heuristics analysis, as well as potentially which attributes are measured. The implementation mechanics of conducting behavior based heuristics analysis at varying levels of aggressiveness 303 are known by those of ordinary skill in the relevant art, and their use within the context of the described embodiments will be readily apparent to those of such a skill level in light of this disclosure.

Once the aggressiveness adjusting module 301 sets the level of aggressiveness 303 to use for a specific file 305 based on its prevalence rate 309, a behavior based heuristics analyzing module 315 applies behavior based heuristics analysis using that aggressiveness level 303, to determine whether the file comprises malware 321. It is to be understood that what specific levels of aggressiveness 303 are applied based on which specific file prevalence rates 309 is a variable design parameter.

Heuristic behavior based detection of malware 321 can be measured by conventional Receiver Operating Characteristics (ROCs) that plot false positive rates against true positive rates. Given a false positive rate that is considered tolerable, conventional ROC based analysis can be used to calculate a corresponding true positive rate. In one embodiment, a tolerance level setting module 323 sets false positive tolerance levels 325 for files 305 at different prevalence rates 309, and a ROC analyzing module 317 determines corresponding aggressiveness levels 303, to which the aggressiveness adjusting module 301 sets the level of aggressiveness 303 for these files 305. It is to be understood that the false positive tolerance levels 325 set by the tolerance level setting module 323 are variable design parameters.

Where the aggressiveness adjusting module 301 adjusts aggressiveness levels 303 based on prevalence rate 309, the ROCs are different at each prevalence rate 309, and thus result in different true positive rates at different prevalence rates 309, given a consistent tolerance for false positives. This is so because, as explained above, lower prevalence files 305 are more likely to be malicious, and thus a corresponding detected positive is less likely to be a false one. Therefore, the actual rates of true positives are higher in the lower prevalence range.

A prevalence weighing module 319 can also dynamically weigh low prevalence files 305 towards being classified as malicious. In other words, the prevalence weighing module 319 can adjust a dynamic attribute to used in the behavior based heuristic analysis of given files 305 in order to cause files 305 with greater prevalence rates 309 to be considered non-malicious more often and files 305 with lower prevalence rates 309 to be considered malicious more often, as opposed to using a hard limit.

In summary, the behavior based heuristics analyzing module 315 analyzes individual files 305 to determine whether they comprises malware 321 using an aggressiveness level 303 adjusted according to the prevalence rate 309 of each analyzed file 305. The behavior based heuristics analyzing module 315 can also use heuristics attributes that weigh lower prevalence files 305 towards being classified as malicious, as described above. These techniques boost detections in the more difficult realm of low prevalence malware 321, and provide a balance between false and true positive rates under varying prevalence rates 309 of different files 305.

It is to be understood that files 305 that are adjudicated to be legitimate 327 can be processed by the computer system 210 as desired, whereas files determined to be malware 321 can be blocked, deleted, quarantined, disinfected or otherwise processed according to conventional anti-malware functionality.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for adjusting an aggressiveness level to use in behavior based heuristics malware detection, based on target file prevalence rates, the method comprising the steps of:
   determining, by a computer, a prevalence rate of a file subject to behavior based heuristics analysis to determine whether the file comprises malware, wherein the prevalence rate reflects a level of distribution of the file;
   adjusting, by a computer, the aggressiveness level to use in the behavior based heuristics analysis of the file, responsive to the determined prevalence rate of the file, comprising setting the aggressiveness level to a higher level for lower prevalence files and to a lower level for higher prevalence files;
   applying, by a computer, behavior based heuristics analysis to the file, using the aggressiveness level; and
   determining, by a computer, whether the file comprises malware, based on the applied behavior based heuristics analysis.

2. The method of claim 1 wherein determining, by a computer, a prevalence rate of a file to be subject to behavior based heuristics analysis to determine whether the file comprises malware further comprises:
   determining, by a computer, the prevalence rate of the file based on data associated with a reputation tracking system.

3. The method of claim 1 wherein determining, by a computer, a prevalence rate of a file to be subject to behavior based heuristics analysis to determine whether the file comprises malware further comprises:
   determining, by a computer, the prevalence rate of the file based on data associated with a malware detection system.

4. The method of claim 1 wherein adjusting, by a computer, the aggressiveness level to use in the behavior based heuristics analysis of the file further comprises:
   setting, by a computer, false positive tolerance levels for files at different prevalence rates; and
   using Receiver Operating Characteristics based analysis, by a computer, to set corresponding aggressiveness levels for files with different set false positive tolerance levels.

5. The method of claim 1 wherein applying, by a computer, behavior based heuristics analysis to the file, using the aggressiveness level further comprises:
   varying, by a computer, treatment of at least some file attributes during the behavior based heuristics analysis of the file, responsive to the aggressiveness level.

6. The method of claim 1 wherein applying, by a computer, behavior based heuristics analysis to the file, using the aggressiveness level further comprises:
   determining, by a computer, which file attributes to measure during the behavior based heuristics analysis of the file, responsive to the aggressiveness level.

7. The method of claim 1 further comprising:
   dynamically weighing, by a computer, lower prevalence files as being more likely to be malicious and higher prevalence files as being more likely to be legitimate.

8. The method of claim 1 wherein determining, by a computer, whether the file comprises malware, based on the applied behavior based heuristics analysis further comprises:
   determining, by a computer, that the file is legitimate; and
   in response to determining that the file is legitimate, allowing, by a computer, standard processing of the file.

9. The method of claim 1 wherein determining, by a computer, whether the file comprises malware, based on the applied behavior based heuristics analysis further comprises:
   determining, by a computer, that the file comprises malware; and
   in response to determining that the file comprises malware, performing, by a computer, at least one additional step from a group of steps consisting of:
   blocking the file;
   deleting the file;
   quarantining the file; and
   disinfecting the file.

10. At least one non-transitory computer readable storage medium storing a computer program product for adjusting an aggressiveness level to use in behavior based heuristics malware detection, based on target file prevalence rates, the computer program product comprising:
    program code for determining a prevalence rate of a file subject to behavior based heuristics analysis to determine whether the file comprises malware, wherein the prevalence rate reflects a level of distribution of the file;
    program code for adjusting the aggressiveness level to use in the behavior based heuristics analysis of the file, responsive to the determined prevalence rate of the file, comprising setting the aggressiveness level to a higher level for lower prevalence files and to a lower level for higher prevalence files;
    program code for applying behavior based heuristics analysis to the file, using the aggressiveness level; and
    program code for determining whether the file comprises malware, based on the applied behavior based heuristics analysis.

11. The computer program product of claim 10 wherein the program code for determining a prevalence rate of a file to be subject to behavior based heuristics analysis to determine whether the file comprises malware further comprises:
    program code for determining the prevalence rate of the file based on data associated with a reputation tracking system.

12. The computer program product of claim 10 wherein the program code for determining a prevalence rate of a file to be subject to behavior based heuristics analysis to determine whether the file comprises malware further comprises:
    program code for determining the prevalence rate of the file based on data associated with a malware detection system.

13. The computer program product of claim 10 wherein the program code for adjusting the aggressiveness level to use in the behavior based heuristics analysis of the file further comprises:
    program code for setting false positive tolerance levels for files at different prevalence rates; and
    program code for using Receiver Operating Characteristics based analysis to set corresponding aggressiveness levels for files with different set false positive tolerance levels.

14. The computer program product of claim 10 wherein the program code for applying behavior based heuristics analysis to the file, using the aggressiveness level further comprises:
    program code for varying treatment of at least some file attributes during the behavior based heuristics analysis of the file, responsive to the aggressiveness level.

15. The computer program product of claim 10 wherein the program code for applying behavior based heuristics analysis to the file, using the aggressiveness level further comprises:

program code for determining which file attributes to measure during the behavior based heuristics analysis of the file, responsive to the aggressiveness level.

16. The computer program product of claim 10 further comprising:

program code for dynamically weighing lower prevalence files as being more likely to be malicious and higher prevalence files as being more likely to be legitimate.

17. The computer program product of claim 10 further comprising:

program code for determining that the file is legitimate;
program code for, in response to determining that the file is legitimate, allowing standard processing of the file;
program code for determining that the file comprises malware; and
program code for, in response to determining that the file comprises malware, performing at least one additional step from a group of steps consisting of:
blocking the file;
deleting the file;
quarantining the file; and
disinfecting the file.

18. A computer system, at least partially implemented in hardware, for adjusting an aggressiveness level to use in behavior based heuristics malware detection, based on target file prevalence rates, the computer system comprising:

a processor;
computer memory;
means for determining a prevalence rate of a file subject to behavior based heuristics analysis to determine whether the file comprises malware, wherein the prevalence rate reflects a level of distribution of the file;
means for adjusting the aggressiveness level to use in the behavior based heuristics analysis of the file, responsive to the determined prevalence rate of the file, comprising setting the aggressiveness level to a higher level for lower prevalence files and to a lower level for higher prevalence files;
means for applying behavior based heuristics analysis to the file, using the aggressiveness level; and
means for determining whether the file comprises malware, based on the applied behavior based heuristics analysis.

* * * * *